(12) United States Patent
Heaton et al.

(10) Patent No.: US 9,274,022 B2
(45) Date of Patent: Mar. 1, 2016

(54) DIAGNOSTIC SYSTEM FOR BULK WELL MATERIAL HANDLING PLANTS

(71) Applicant: Halliburton Energy Services, Inc., Houston, TX (US)

(72) Inventors: John G. Heaton, Duncan, OK (US); Elizabeth L. Wells, Murphy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 287 days.

(21) Appl. No.: 13/940,732

(22) Filed: Jul. 12, 2013

(65) Prior Publication Data

US 2015/0013436 A1    Jan. 15, 2015

(51) Int. Cl.
*G01M 3/28* (2006.01)

(52) U.S. Cl.
CPC .............. *G01M 3/28* (2013.01); *G01M 3/2815* (2013.01); *G01M 3/2846* (2013.01); *G01M 3/2876* (2013.01)

(58) Field of Classification Search
CPC ... G01M 3/28; G01M 3/2815; G01M 3/2846; G01M 3/2876
USPC ...................................................... 73/40.5 R
See application file for complete search history.

(56) References Cited

U.S. PATENT DOCUMENTS

| | | | | |
|---|---|---|---|---|
| 3,624,627 A | * | 11/1971 | Evans | 137/557 |
| 4,417,465 A | * | 11/1983 | Noe et al. | 73/49.5 |
| 5,018,868 A | | 5/1991 | Baillie | |
| 6,668,620 B2 | * | 12/2003 | Pond et al. | 73/46 |
| 6,980,914 B2 | | 12/2005 | Bivens et al. | |
| 7,488,141 B2 | | 2/2009 | Bivens et al. | |
| 7,542,864 B2 | | 6/2009 | Bivens et al. | |
| 2005/0155667 A1 | | 7/2005 | Stegemoeller | |
| 2008/0197605 A1 | | 8/2008 | Blaschke et al. | |
| 2010/0025041 A1 | | 2/2010 | Phillippi et al. | |
| 2011/0100096 A1 | * | 5/2011 | Szepek et al. | 73/40.5 R |
| 2012/0128449 A1 | | 5/2012 | Fikes et al. | |

OTHER PUBLICATIONS

Authorized Officer Jong Kyung Lee, PCT International Search Report and Written Opinion of the International Searching Authority, PCT/US2014/046414, Oct. 29, 2014, 9 pages.

* cited by examiner

*Primary Examiner* — Daniel S Larkin
(74) *Attorney, Agent, or Firm* — John W. Wustenberg; Fish & Richardson P.C.

(57) ABSTRACT

Diagnostic system for bulk well material handling plants that includes multiple fluid flow pathways to transport well materials. The bulk well material handling system includes multiple connections, each connected to a fluid flow pathway. The system also includes a control system connected to the multiple connections and adapted to automatically operate one or more connections of the multiple connections to a fluid flow pathway to analyze a pneumatic integrity of the fluid flow pathway in the bulk material handling system.

20 Claims, 4 Drawing Sheets

DIAGNOSTIC SYSTEM FOR BULK WELL MATERIAL HANDLING PLANTS

TECHNICAL FIELD

This disclosure relates to bulk well material handling plants, for example, handling plants that store and blend bulk materials for use in oil and gas well applications.

BACKGROUND

Bulk well material handling plants include equipment for handling, e.g., storing, transferring, blending, dry materials used in constructing wells, treating wells and subterranean formations, and for other well activities. For example, bulk well material handling plants handle dry cement and additives for cementing casing, dry fracturing fluid components, for fracturing treatments, dehydrated or dry treatment chemicals, and the like. Such plants typically include tanks to store the dry well materials as well as equipment to transport the well materials between the tanks, for example, conveyor belts, screw conveyors, stackers, reclaimers, and other similar equipment. In some situations, dry materials can be pneumatically transported through the bulk well material plant via fluid flow pathways, e.g., air flow pathways. For example, dry well material stored in a first tank in the plant can be transported to a second tank in the plant through conduits and a sequence of valves that connects the two tanks. Multiple such conduits and valves can be implemented throughout the bulk well material plant to connect the tanks and equipment, and to transport dry well materials throughout the plant. Over time, the various manifolds, valves, and other equipment in the bulk well material handling plant can result in physical degradation of the system. Examples include stuck or leaking valves, restricted or plugged manifolds, plugged, torn, or otherwise compromised dust collection filters, and other equipment wear. This can result not only in inefficiencies in the operation of the bulk well material plant but also untimely and costly system failures and incorrectly blended material resulting in job failures.

BRIEF DESCRIPTION OF THE DRAWINGS

Like reference numbers and designations in the various drawings indicate like elements.

DETAILED DESCRIPTION

This disclosure describes automatically running diagnostic checks on bulk well material handling plants. A bulk well material plant, for example, a bulk well material storage and well material blending plant, can include a network of conduits, e.g., manifolds, to convey, e.g., flow, using vacuum or pressure, dry powders through one or more tanks for weighing, blending, and delivering to transport vehicles which will deliver the blended materials to well sites. Examples of such materials include dry cement and dry cement additives that are blended in the bulk well material plant and transported to a well site to be slurried for wellbore cementing. In general, the diagnostic checks described here can be implemented in any plant through which material, for example, dry material, is conveyed, for example, flowed pneumatically. Such dry material can be used, e.g., in dry food, feed, seed, and chemical applications.

In a bulk well material storage and blending plant through which dry powders are pneumatically conveyed, the transport of dry, often abrasive, powders can cause wear in the components of the plant, for example, valves, manifold walls, and other components. Identifying locations of wear can be difficult, tedious, and, because of large quantities of available data, impossible, even for experienced plant operators. Failure to detect leaks, restrictions, plugs, and other maintenance issues in a timely manner can result in air or well material loss (or both) or gain through the manifolds or valves (or both), incorrect blended material composition, and in inefficiencies in well material transport through the plant. Such failure can also result in a major operational problem or disaster, at which point downtime is required to mitigate the issues resulting in increased operational costs, job delays or failures, and possibly contaminated or wasted material.

This disclosure describes automated diagnostics routines that can monitor the bulk well material handling plant, in particular, the pneumatic fluid flow pathways of the bulk well material handling plant, to identify maintenance issues that require attention and generate notifications. The notifications and maintenance issues can relate to, for example, valves and other equipment in the plant. The diagnostic system described here can notify a plant operator of an existence of a stuck or leaking valve or conduit restriction or leak, as well as its location. In a large bulk well material plant which may include several hundreds (perhaps thousands) of pieces of equipment, manifolds, and valves, a notification of the location of malfunctioning valves, restrictions, plugs or leaks can be very beneficial. The diagnostic system described here includes multiple sensors dispersed throughout the bulk well material plant from which data describing plant operation is collected either during a diagnostics operation or during normal plant operation, or both. The diagnostic system can process the received data to determine if any problems exist in certain areas of the plant. A diagnostics operation can test, for example, a specific plant area by causing valves to be opened or closed (or both), and applying pressure to or pulling a vacuum on a tank or manifold, to identify any leaks, plugs, or other failures in that plant area to preempt a deterioration of problems.

The diagnostic system can reduce initial training requirements for new plant operators and enable best practices of experienced operators who know and understand the bulk well material systems. By uniformly implementing the automated techniques described here, occurrences of expensive and untimely job delays can be decreased and expensive replacements/repairs that can be attributed to poor awareness of the bulk well material plant health can be reduced. The diagnostic system can reduce the risk of bad jobs resulting from poor quality of the blended dry materials, due, in part, to the bulk well material plant operating differently from an operator's expectation. For example, an operator may expect that valves in manifolds that deliver blended material to trucks are air tight when, in fact, the valves may be leaking resulting in part of the blend inadvertently being transferred to a different tank or going to waste. In another example, different dry materials may be transported to a blend where the operator is unaware of leaking discharge valves. Power requirements can be reduced by the detection and minimizing or elimination of leaks in the bulk well material system. Because each plant is unique in terms of equipment, tank layout, and manifold configuration, the diagnostic system can be implemented as a modularized system that is easy to customize. In addition, spurious or uncontrolled emissions into the environment can be prevented or minimized by early detection of leaks in valves, filters and seals. Elimination of leaking or malfunctioning valves through early detection can minimize wasted power for compressed air to overcome the material transfer inefficiencies they cause.

Figure 1:
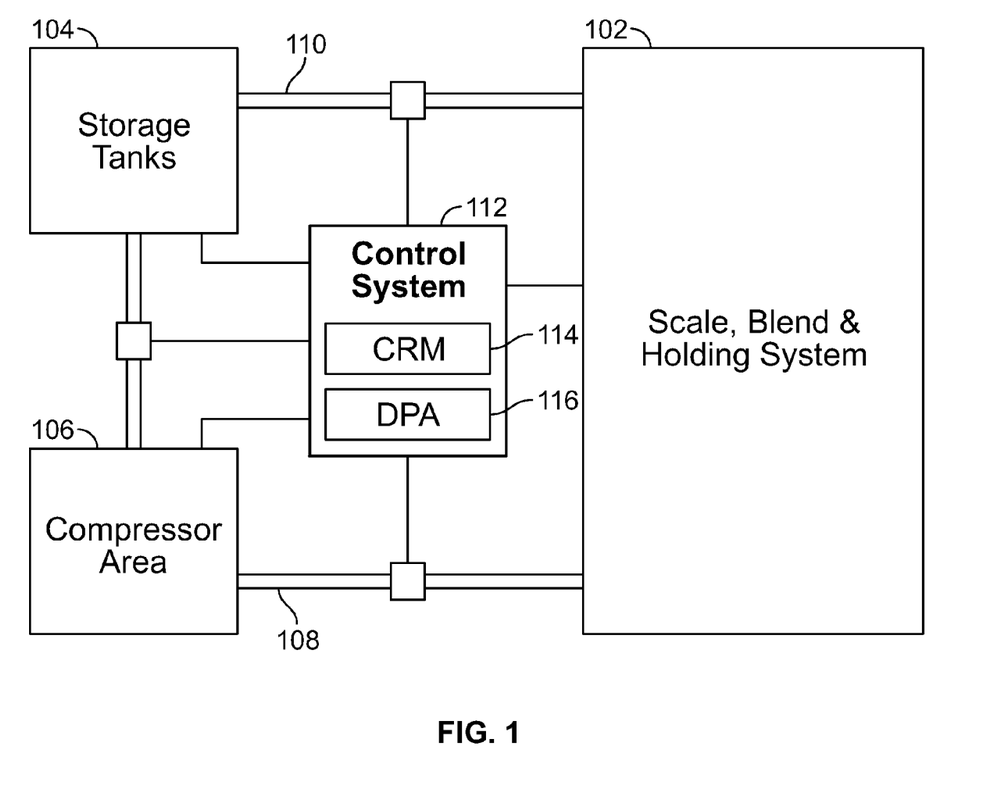
FIG. 1 illustrates an example control system implemented to monitor an example bulk well material handling system.

FIG. 1 illustrates an example control system 112 implemented to monitor an example bulk well material handling system 102. In some implementations, the bulk well material handling system 102 can be a scale, blend and holding system that can include multiple fluid flow pathways through which to transport well materials. For example, the scale, blend, and holding system can be a dry cement plant in which different materials can be blended to produce dry cement that can be transported to well sites to be slurried for well cementing. As described below, the bulk well material handling system 102 can include one or more scale tanks to weigh quantities of dry materials and one or more blend tanks to blend two or more dry materials. The dry materials can include, for example, cement, bulk additives, or other materials. In the example implementations described here, the different materials are transported to the different tanks by air flow. In some implementations, the materials can be transported by fluids other than air, e.g., nitrogen or other similar fluids that do not affect the dry materials being transported.

The dry materials can be stored in storage tanks 104 (or fed through additive tanks, feeders or hoppers) and transported, for example, pneumatically, to the bulk well material handling system 102 through one or more air flow pathways (for example, manifold 110). In some implementations, the storage tanks 104 can be connected to pumps, for example, positive displacement blowers, compressors or vacuum pumps, which provide air supply to flow the dry materials to the bulk well material system 102. A compressor area 106 can include multiple compressors and blowers that are pneumatically connected to the bulk well material system 102 through one or more air flow pathways (for example, manifold 108). The compressors 106 can generate air to flow the dry materials through the bulk well material system 102 or from the storage tanks 104 to the bulk well material system 102 through the one or more manifolds.

The bulk well material handling system 102 can include multiple connections, each of which can be pneumatically connected to an air flow pathway of the bulk well material handling system 102. The control system 112 can be connected to the multiple connections and can operate to analyze a pneumatic integrity of the multiple air flow pathways in the bulk well material handling system 102. For example, the multiple connections can include one or more conduits or one or more valves (or combinations of them) that interface with the air flow pathways in the bulk well material handling system 102. The control system 112 can control one or more compressors in the compressor area 106 to flow air to the multiple air flow pathways through the multiple connections to analyze the pneumatic integrity of the multiple air flow pathways.

In some implementations, the control system 112 can be a computer system that can include a computer-readable medium 114 storing computer instructions executable by data processing apparatus 116 to perform diagnostic operations described here. For example, the control system 112 can be a programmable logic controller (PLC) that can be implemented as hardware, software, firmware, or combinations of them. In some implementations, the PLC controller can be adapted to provide instructions to perform operations of the bulk well material handling system 102, for example, to transport dry materials through the air flow pathways, to blend quantities of two or more dry materials, and the like. Such a PLC controller can be further adapted to implement the diagnostic operations described here.

Figure 2:
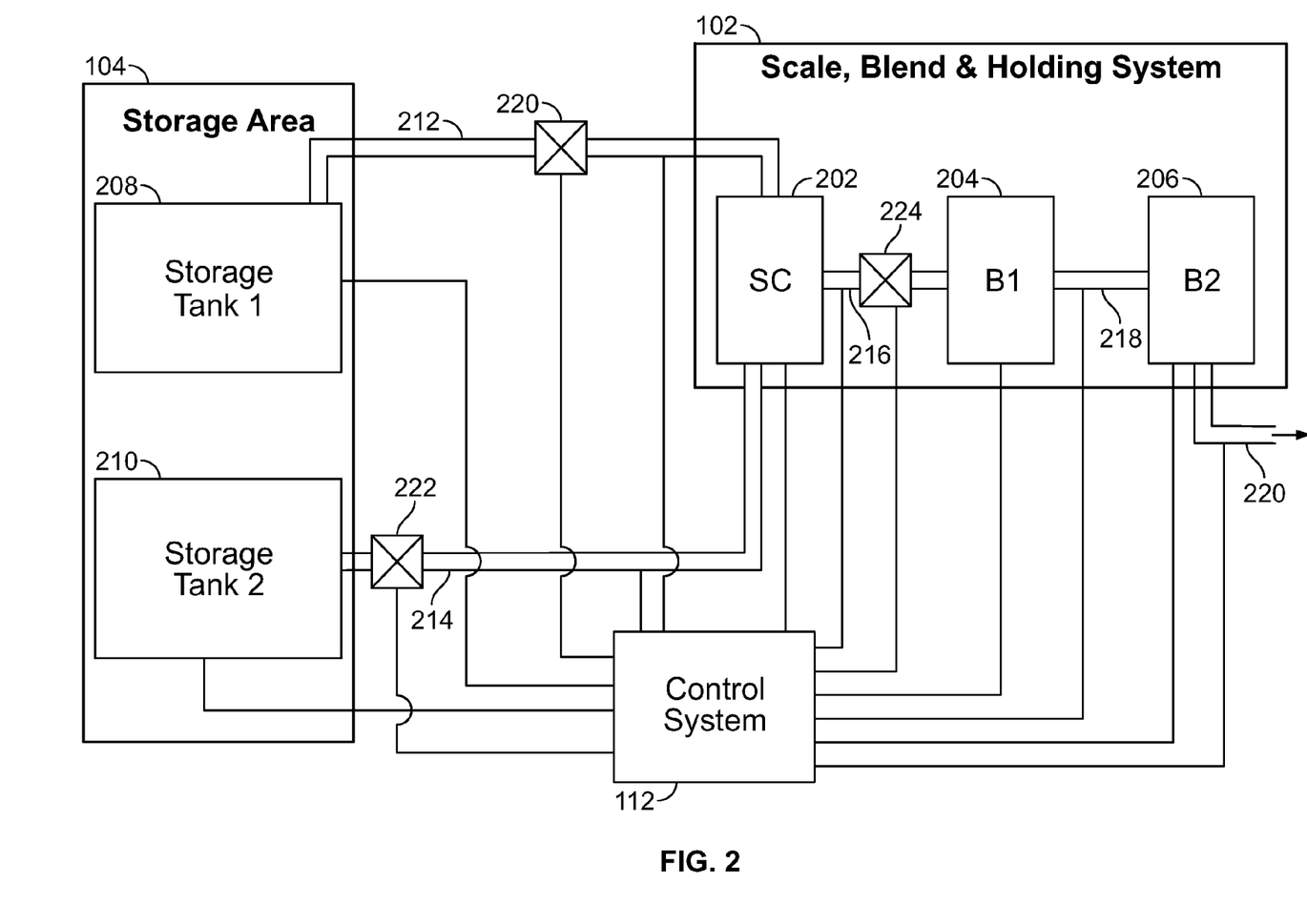
FIG. 2 illustrates an example of a bulk well material handling system that includes a scale tank and blend tanks to which dry well materials are transported through conduits.

FIG. 2 illustrates an example of a bulk well material handling system 102 that includes a scale tank 202 and blend tanks (for example, a first blend tank 204, a second blend tank 206) to which dry materials are transported through pipe manifolds. The scale tank 202 can receive a first dry material from a first storage tank 208 through a manifold 212. The scale tank 202 can also receive a second dry material from a second storage tank 210 through a manifold 214. For example, the control system 112 can draw vacuum through the manifold 212 to transport the first dry material from the first storage tank 208. The scale tank 202 can weigh a quantity of the first dry material and a quantity of the second dry material.

The scale tank 202 can be connected to a first blend tank 204 through a manifold 216. For example, the scale tank 202 can be pneumatically connected to the first blend tank 204. The first blend tank 204 can receive the first dry material and the second dry material from the scale tank 202, to blend the transported dry materials. For example, the control system 112 can pressurize the scale tank 202 and open the valve 224 to transport the dry materials from the scale tank 202 to the first blend tank 204. In some implementations, the bulk well material handling system 102 can include a second blend tank 206 connected to the first blend tank 204 through a manifold 218. The second blend tank 206 can receive the blend of the first dry material and the second dry material from the first blend tank 204, to further blend the two dry materials. Alternatively, or in addition, the second blend tank 206 can receive a third dry material from a third storage tank (not shown) to blend the third dry material with the blend of the first and second dry materials. The second blend tank 206 can deliver the blend of the dry materials, for example, to a transport vehicle (not shown) for transport to a job site, through a manifold 220.

The control system 112 can be connected to each component shown in FIG. 2 and can be adapted to cause the first dry material and the second dry material to flow from the first storage tank 208 and the second storage tank 210 through the manifold 212 and the manifold 214 to the scale tank 202. The control system 112 can be connected to the valve 220 and the valve 222 to regulate the flow of the dry materials through the manifold 212 and the manifold 214. In addition, the control system can be connected to a valve in the conveying air supply manifold (not shown) to regulate the flow of conveying air and thus the flow of material.

The control system 112 can be adapted to detect a problem with the pneumatic integrity of the fluid flow pathways in the bulk well material handling system 102, the well material storage area 104, or the compressor area 106. Example techniques implemented by the control system 112 to detect a problem with the pneumatic integrity of the air flow pathways and the material flow pathways that connect to the scale tank 202 are described below. In some implementations, a fluid flow pathway and a material flow pathway can be the same pathway. For example, the control system 112 can determine a flow rate of the first dry material from the first storage tank 208 to the scale tank 202 by determining a weight change in the scale tank 202 and dividing the weight change by a time duration to transfer the first dry material. The control system 112 can determine a ratio of the determined flow rate and the baseline flow rate. If the ratio satisfies a threshold, then the control system 112 can determine that the fluid flow pathways and the material flow pathways are normal. For example, the threshold can be satisfied if the ratio is within 10% of the baseline flow rate.

The control system 112 can maintain a history of flow rates of the first dry material into the scale tank 202. If the ratio does not satisfy the threshold, then the control system 112 can determine whether the ratios of past flow rates to the baseline flow rate have historically not satisfied the threshold. For example, the control system 112 can determine if ratios of two immediately preceding flow rates and the baseline flow rate also failed to satisfy the threshold determined as described above. If the control system 112 determines that ratios of two immediately preceding flow rates and the baseline flow rate also failed to satisfy the threshold determined as described above, then the control system 112 can store the most recent failure to satisfy the threshold and determine that the fluid flow pathways and the material flow pathways are abnormal. In this case, the control system 112 can transmit a signal notifying an operator of the failure in the bulk well material handling system 102.

In addition, the control system 112 can be adapted to analyze the pneumatic integrity of the bulk well material handling system 102, the storage areas 104, or the compressor area 106. For example, the control system 112 can be adapted to diagnose and isolate problems detected, for example, a leak or a clogging, in the bulk well material handling system 102, the storage areas 104, or the compressor areas 106. Alternatively, or in addition, the control system 112 can perform preventative maintenance inspections by analyzing the pneumatic integrity either periodically (for example, daily, weekly, bi-weekly, monthly) or in response to user input, for example, when an operator suspects a problem with the bulk well material handling system 102 (or combinations of them).

Analyzing the pneumatic integrity of the bulk well material handling system 102 can include analyzing each tank included in the bulk well material handling system 102 as well as the multiple fluid flow pathways and the material flow pathways (for example, the manifold 212, the manifold 214, the valve 220, and the valve 222) that transport dry materials between tanks. For example, the control system 112 can be connected to a valve 224 attached to the manifold 216 through which the blend of dry materials from the scale tank 202 flows to the first blend tank 204. The control system 112 can be adapted to analyze the first blend tank 204, the manifold 216 and the valve 224. In this manner, the control system 112 can be adapted to analyze each component shown in FIGS. 1 and 2, and each manifold and valve that connects the components shown in FIGS. 1 and 2.

Example techniques implemented by the control system 112 to analyze the pneumatic integrity of tanks in the bulk handling system 102 are described here. In some implementations, the control system 112 can raise a pressure in a pressure tank in the bulk well material handling system 102 (for example, the scale tank 202) to a pre-determined test pressure, then close all the fluid flow pathways that connect to the tank (for example, the manifolds 212, 214 and 216, and the valves 220, 222 and 224), and monitor the tank for a decrease in a pressure relative to the pre-determined test pressure over time. The control system 112 can include one or more pressure sensors (not shown) that can sense pressures in the fluid flow pathways. The control system 112 can measure multiple pressures based on the pressures sensed by the pressure sensors at respective multiple time instants. The control system 112 can determine a decrease in a pressure relative to the pre-determined test pressure, for example, based on a difference in a pressure measured at a time instant and a pressure measured at a previous time instant. In this manner, the control system 112 can determine a decrease in a pressure relative to the pre-determined test pressure in response to monitoring each tank, for example, the scale tank 202.

The control system 112 can determine that there is an unacceptable leak in the system if the determined pressure is a certain percentage below the pre-determined test pressure. For example, the control system 112 can store a threshold pressure loss, which can represent an acceptable decrease in pressure relative to the pre-determined test pressure. If the determined pressure drops below the pre-determined test pressure, and the pressure loss exceeds the threshold pressure loss, then the control system 112 can determine that there is a leak in the system. In some implementations, the control system 112 can determine that there is a leak in the system if a rate at which the pressure drops from the pre-determined test pressure is greater than a stored threshold rate.

In response to determining the decrease in the pressure relative to the pre-determined test pressure, the control system 112 can determine whether the decrease in the pressure relative to the pre-determined test pressure is due to a leak in one or more fluid flow pathways that connect to the tank. In the example in which the tank is the scale tank 202, the control system 112 can determine whether the decrease in the pressure relative to the pre-determined test pressure is due to a leak in one or more of the manifolds 212, 214 and 216 or one or more of the valves 220, 222, or 224 (or combinations of them). To determine that the decrease in the pressure relative to the pre-determined test pressure is due to a leak in one or more fluid flow pathways that connect to the tank, the control system 112 can determine an absence of a leak in a remainder of the bulk well material handling system 102. To do so, for example, the control system 112 can monitor a pressure sensed by other pressure sensors dispersed throughout the bulk well material handling system 102 to determine whether there has been a drop in pressure sensed by any of the other pressure sensors.

If the control system 112 determines a drop in the pressure sensed by any of the other pressure sensors, then the leak in the scale tank 202 may not be due to a leak in one or more of the manifolds 212, 214 and 216 or one or more of the valves 220, 222, or 224 (or combinations of them). On the other hand, if the control system 112 determines an absence of a drop in the pressure sensed by any of the other pressure sensors, then the leak in the scale tank 202 is likely due to a leak in the manifolds or the valves. To identify the manifold or the valve that is the cause of the leak, the control system 112 can sequentially isolate each manifold or valve by causing fluid to flow through each manifold or valve that is connected to the tank while closing other manifolds or valves that are connected to the tank until the manifold or valve that causes the leak is identified. An order of valves in the sequence can depend on a purpose of the valve. For example, the control system 112 can analyze the pneumatic integrity of a valve that regulates flow of dry materials into the scale tank 102 before analyzing the pneumatic integrity of a valve that regulates discharge of pressure in the scale tank 102. Similarly, an order of manifolds in the sequence can also depend on the material or fluid that is flowed through the manifold. In this manner, the control system 112 can analyze the pneumatic integrity of air flow pathways that connect to the scale tank 202 in the bulk well material handling system 102.

When the control system 112 identifies a cause of the leak (for example, a manifold, a valve, or the tank itself), the control system 112 can transmit a signal to a computer system (for example, a desktop computer, a laptop computer, a smartphone, a tablet computer, or other similar computer systems) identifying the cause of the leak. An operator of the computer system can take preventative actions in response to receiving the signal. If the control system 112 determines that there is no leak in the tank, or valves or manifolds connected to the tank, then the control system 112 can repeat the techniques described above for another tank, for example, the first blend tank 204, in the bulk well material handling system 102. After analyzing the pneumatic integrity of all the tanks of the bulk well material handling system 102, the control system 112 can analyze the pneumatic integrity of the other components of the bulk well material handling system 102 as described below with reference to FIG. 3.

Example techniques implemented by the control system 112 to analyze the pneumatic integrity of the storage tanks (for example, the first storage tank 208, the second storage tank 210) are described here. The storage tanks are typically not pressure holding vessels. To analyze the storage tanks, the control system 112 can analyze the manifolds that attach to the storage tanks. The control system 112 can apply compressed air (for example, from one of the compressors in the compressor area 106 or from a separate source) to a common storage aeration manifold (not shown) that connects to each of the storage tanks in the storage area 104. The control system 112 can then cause the main air supply valve to close so that pressure is trapped in the common storage aeration manifold. With all valves closed, the control system 112 can monitor for a drop in the pressure in the common storage aeration manifold.

If the control system 112 identifies a pressure drop in the common storage aeration manifold, the control system 112 can implement a sequence of operations to isolate a leaking, stuck, or blocked valve. For the manifold 212 that is connected to the common storage aeration manifold, the control system 112 can open secondary discharge valves that connect to the scale tank 202 while keeping the primary storage discharge valve (for example, the valve 220), aeration valve and purge valves closed. If the control system 112 does not identify a pressure drop, then the control system 112 can repeat the isolation techniques described here to the next manifold, for example, the manifold 214. A drop in manifold pressure can indicate that a purge valve for the manifold is leaking. In other examples, the control system 112 can open various possible valve paths and monitor manifold pressures to confirm whether air pressure is increasing or not increasing as appropriate.

Figure 3:
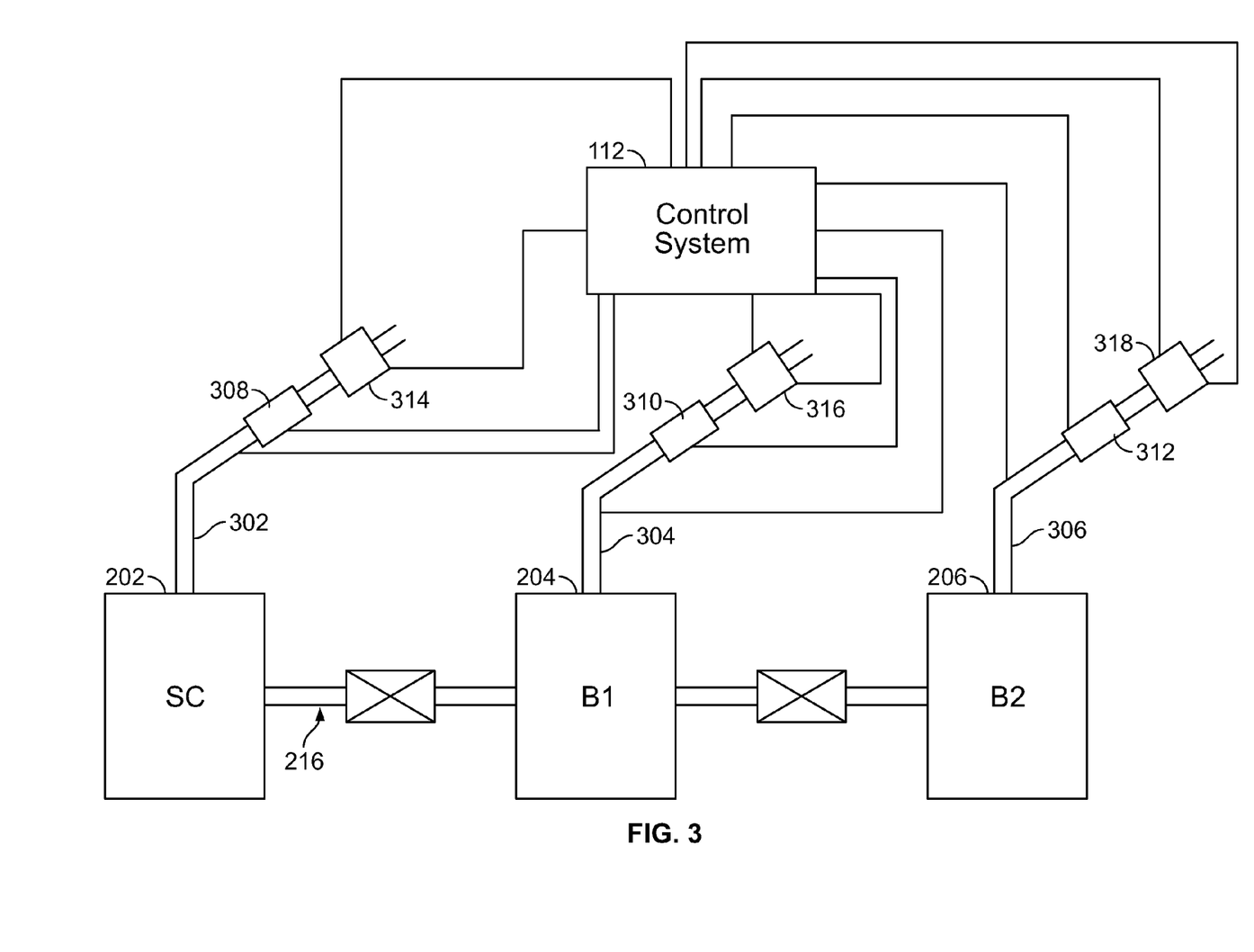
FIG. 3 illustrates an example of the bulk well material handling system of FIG. 1 including dust collectors.

FIG. 3 illustrates an example of the bulk well material handling system of FIG. 1 including dust collectors. For example, a first dust collector 308 can be connected to the scale tank 202 through a manifold 302. A second dust collector 310 and a third dust collector 312 can be connected to the first blend tank 204 and the second blend tank 206, respectively, through a manifold 304 and a manifold 306, respectively. In some implementations, the dust collectors can be shaker-type dust collectors with or without fans or pulse jet type dust collectors or other commonly used dust collectors. Each of the first dust collector 308, the second dust collector 310, and the third dust collector 312 can be connected to a first differential pressure transducer 314, a second differential pressure transducer 316, and a third differential pressure transducer 318, respectively.

The controller 112 can be connected to each of the components shown in FIG. 3 and can be adapted to operate the dust collectors, to analyze an operational performance of the dust collectors, and to analyze a pneumatic integrity of the manifolds that connect the dust collectors to the tanks. For example, a mechanical shaker (not shown) can be connected to a dust collector and to the control system 112. The shaker can be operated using an air piston and an electric solenoid valve to pass air into the dust collector. To analyze an operational performance of the dust collectors, the control system 112 can periodically activate the shaker. An operator can check whether the dust collector shakes when activated.

Each dust collector can include an inlet and outlet without any flow regulation devices, e.g., valves. Alternatively, or in addition, each dust collector can be connected to flow regulation devices, e.g., valves such as vent valves, discharge valves, bypass valves, fill valves, along with the valves that connect the dust collector to the respective tank. The control system 112 can monitor each flow regulation device connected to a dust collector in a manner similar to other valves described here. In some implementations, the control system 112 can cause the dust collectors to be shaken for a specified period of time. The control system 112 can then cause air to be flowed through the dust collectors, for example, by pressurizing the respective tanks connected to the dust collectors. For each dust collector, the control system 112 can monitor a respective differential pressure measured by the differential pressure transducer. The control system 112 can also cause the fluid flow pathways in the gauge lines across which the differential pressures are measured to be purged.

Example operations to monitor the dust collectors and to analyze a pneumatic integrity of the fluid flow pathways that connect the dust collectors and the tanks in the bulk well material handling system 102 are described here. The control system 112 can clean the dust collectors by causing the respective mechanical shakers to shake the dust collectors for a specified period, for example, seven seconds. The control system 112 can then establish a repeatable, stable air flow through each dust collector. To do so, the control system 112 can cause all air flow pathways (for example, fill lines, hatches, relief hatches, and other suitable inlets) to be closed and then open a fluid flow pathway (for example, the manifold 302) that connects a tank (for example, the scale tank 202) and the dust collector (for example, the first dust collector 308). For a dust collector equipped with a fan, the control system 112 can then turn on the fan of the first dust collector 308 and verify significant air flow. If the dust collector is not equipped with a fan, the control system 112 can determine that all outlet fluid flow pathways except an outlet fluid flow pathway connected to the first dust collector 308 are closed. The control system 112 can cause a compressor to supply air to the scale tank 202 through the fluid flow pathway connected to the scale tank 202.

The control system 112 can measure and record a differential pressure reading sensed by the differential pressure transducer 314. In some implementations, the control system 112 can additionally determine and record a time stamp (for example, date and time) for each differential pressure reading. The control system 112 can periodically (for example, daily, weekly, bi-weekly, monthly), or in response to input, purge the manifolds that connect the differential pressure transducer to the dust collector, for example, by opening a purge valve connected to the manifold and causing compressed air to be blown through the manifold. Alternatively, an operator of the bulk well material handling system 102 can periodically purge the manifold.

In some implementations, the control system 112 can determine conditions of the fluid flow pathways that connect the tanks to other components (for example, the storage tanks, the dust collectors, and other suitable components). To do so, the control system 112 can raise a pressure a pressure tank (for example, the scale tank 202) to a pre-determined test pressure, vent the pressure through one or more fluid flow pathways that are connected to the scale tank 202, and monitor a time for the pressure to vent. Based on the monitoring, the control system 112 can determine sock failure or degradation in a dust collector or plugging in a fluid flow pathway when a tank is vented to another tank with a dust collector. For example, if a time for the pressure to vent through the manifold 216 that connects the scale tank 202 to the first blend tank 204 is greater than a threshold time, then the control system 112 can determine that the manifold 216 is clogged, or that a valve in the manifold path is blocked from opening fully, or that the vent path on the first blend tank 204 is restricted. The threshold time can be based on previous instances of venting pressure through the manifold 216. For example, if the time to vent the pressure through the manifold 216 in a current instance is significantly greater than multiple previous instances of venting pressure through the manifold 216, that is an indication that the manifold 216 is clogged, or that a valve in the manifold path is blocked from opening fully, or that the vent path on the first blend tank 204 is restricted. The control system 112 can transmit a signal notifying an operator of the clogging, blockage, or restriction.

Figure 4:
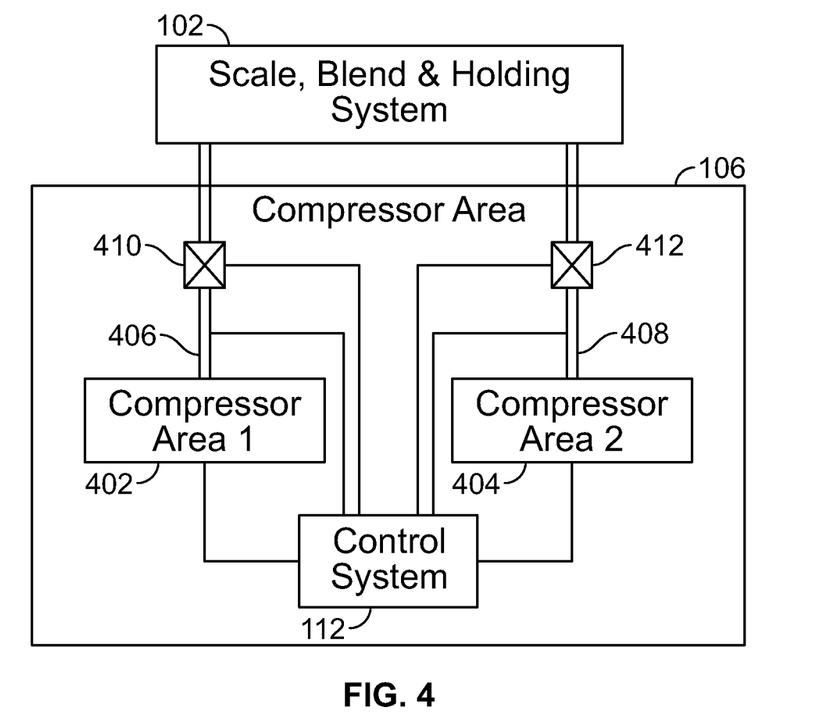
FIG. 4 illustrates an example of compressors that flow compressed air through the bulk well material handling system of FIG. 1.

FIG. 4 illustrates an example of compressors that flow compressed air through the bulk well material handling system of FIG. 1. The compressor area 106 can include a first compressor 402 and a second compressor 404 connected to the bulk well material handling system 102 through a manifold 406 and a manifold 408, respectively. A valve 410 and a valve 412 can be attached to the manifold 406 and the manifold 408, respectively, to control air flow through the manifolds. The control system 112 can be connected to each component shown in FIG. 4 to operate the compressors and to analyze a pneumatic integrity of the compressors or the fluid flow pathways that connect the compressors and the bulk well material handling system 102.

In some implementations, the control system 112 can cause a pressure in one or more tanks in the bulk well material handling system 102 (for example, the scale tank 202, the first blend tank 204, the second blend tank 206) connected to the compressors (for example, the first compressor 402, the second compressor 404) to be increased to a pre-determined test pressure. The control system 112 can monitor the tanks for a decrease in pressure relative to the pre-determined test pressure, specifically due to a venting of the pressure through the fluid flow pathways (for example, the manifolds 406, 408 or the valves 410, 412). In this manner, the control system 112 can test compressor performance by automating a series of tests to pressure up various tanks using different combinations of compressors. To do so, the control system 112 can maintain a history of threshold pressures and threshold rates of pressure decreases in the equipment (i.e., the manifolds, valves, tanks, compressors, storage tanks, and other components). The control system 112 can have determined the threshold pressures and the threshold rates of pressure decreases during past operations of the bulk well material handling system 102. To analyze the pneumatic integrity of the fluid flow pathways, the control system 112 can compare pressures and rates of pressure decreases in the multiple fluid flow pathways with the threshold pressures and the threshold rates of pressure decreases. If a rate of pressure decrease is significantly different from (i.e., significantly greater than or less than) a threshold rate of pressure decrease, the control system 112 can transmit a signal to an operator of the bulk well material handling system 102.

Figure 5:
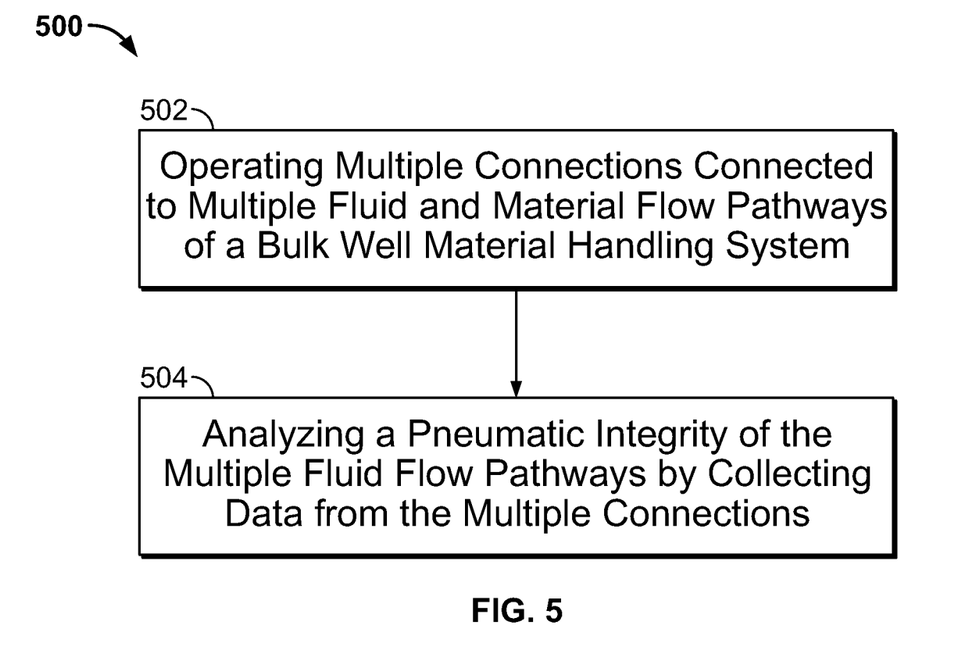
FIG. 5 is a flowchart of an example process for analyzing a pneumatic integrity of a bulk well material handling system.

FIG. 5 is a flowchart of an example process for analyzing a pneumatic integrity of a bulk well material handling system. The process 500 can be implemented by a control system (for example, the control system 112) as hardware, software, firmware, or a combination of them. The control system 112 can include a computer-readable medium 114 that stores computer instructions executable by data processing apparatus 116 to perform operations described here. The computer-readable medium 114 can be any medium that participates in providing instructions to the data processing apparatus 116 for execution, including without limitation, non-volatile media (e.g., optical or magnetic disks), volatile media (e.g., memory) and transmission media. The control system 112 can include one or more network interfaces and one or more input devices. The control system 112 can also include one or more output devices. The components of the computer system 112 can be coupled by a bus.

At 502, multiple connections, each of which is connected to a fluid flow pathway to transport materials through a bulk well material handling system, can be operated. At 504, a pneumatic integrity of multiple fluid flow pathways in the bulk well material handling system can be analyzed by collecting data from the multiple connections responsive to the operating. The data can include pneumatic data representing air pressure in the equipment, manifolds, and valves described above with reference to FIGS. 1-4. The example systems described above can include several additional equipment (for example, tanks) and fluid flow pathways (for example, manifolds, valves), each of which can be connected to the control system 112. For example, each tank in the bulk well material handling system 102 can include a respective discharge valve. Several such discharge valves can be spaced apart, for example, between 40 and 60 feet or more. The control system 112 can collect the data and implement the techniques described above to not only identify a leak or restriction in the system but also to identify a location of the leak. The control system 112 can provide an operator with a notification and the location of the leak or restriction.

The term "computer-readable medium" refers to a medium that participates in providing instructions to data processing apparatus for execution, including without limitation, non-volatile media (e.g., optical or magnetic disks), volatile media (e.g., memory) and transmission media. Transmission media includes, without limitation, coaxial cables, copper wire and fiber optics.

A number of implementations have been described. Nevertheless, it will be understood that various modifications may be made without departing from the spirit and scope of the disclosure.

What is claimed is:

1. A system comprising:
   a bulk well material handling system comprising a plurality of fluid flow pathways to transport materials therethrough;
   a plurality of connections connected to the plurality of fluid flow pathways of the bulk well material handling system; and
   a control system connected to the plurality of connections and adapted to automatically operate one or more connections of the plurality of connections to a fluid flow pathway to analyze a pneumatic integrity of the plurality of fluid flow pathways in the bulk well material handling system by collecting data from the plurality of connections responsive to the operating.

2. The system of claim 1, wherein the bulk well material handling system includes:
   a scale tank to receive a first dry material and a second dry material through a first fluid flow pathway and a second fluid flow pathway to weigh a quantity of the first dry material and a quantity of the second dry material, and to blend the first dry material and the second dry material using at least one of multiple transfers, blades, ribbons, plows, induced turbulence or tumbling; and a blend tank pneumatically connected to the scale tank through a third fluid flow pathway to receive the first dry material and the second dry material from the scale tank to blend the received first dry material and the received second dry material, and wherein the control system is connected to each of the first fluid flow pathway, the second fluid flow pathway, and the third fluid flow pathway and adapted to automatically operate one or more respective connections to each of the first fluid flow pathway, the second fluid flow pathway, and the third fluid flow pathway to analyze the pneumatic integrity of the first fluid flow pathway, the second fluid flow pathway, and the third fluid flow pathway.

3. The system of claim 2, wherein, to automatically operate the one or more respective connections to each of the first fluid flow pathway, the second fluid flow pathway, and the third fluid flow pathway, the control system is adapted to:

raise a pressure in the scale tank to a pre-determined test pressure;

close the first fluid flow pathway, the second fluid flow pathway, and the third fluid flow pathway; and monitor the scale tank for a decrease in the pressure relative to the pre-determined test pressure.

4. The system of claim 3, wherein the control system is further adapted to:

determine a decrease in a pressure relative to the pre-determined test pressure in response to monitoring the scale tank; and in response to determining the decrease, determine whether the decrease is due to a leak in the first fluid flow pathway, the second fluid flow pathway, the third fluid flow pathway, or an outlet to atmosphere.

5. The system of claim 4, wherein the first fluid flow pathway, the second fluid flow pathway, and the third fluid flow pathway include a first valve through which the first dry material is flowed into the scale tank, a second valve through which the second dry material is flowed into the scale tank, and a third valve through which a blend of the first dry material and the second dry material is flowed from the scale tank into the blend tank, and wherein, to determine that the decrease in the pressure relative to the pre-determined test pressure is due to a leak in the first valve or in the second valve, the control system is adapted to determine an absence of a leak in the third valve and an outlet to the atmosphere.

6. The system of claim 5, wherein, to determine that the decrease in the pressure relative to the pre-determined test pressure is due to a leak in the third valve, the control system is adapted to:

determine the absence of a leak in the remainder of the bulk well material handling system; and determine an absence of a leak in either the first valve or the second valve.

7. The system of claim 2, wherein to automatically operate the one or more respective connections to each of the first fluid flow pathway, the second fluid flow pathway, and the third fluid flow pathway, the control system is adapted to:

raise a pressure in the scale tank to a pre-determined test pressure;

vent the pressure in the scale tank through the third fluid flow pathway; and monitor a time for the pressure to vent through the third fluid flow pathway.

8. The system of claim 7, wherein the control system is adapted to:

determine that a time for the pressure to vent through the third fluid flow pathway from the scale tank to the blend tank is greater than a threshold time; and in response to determining that the time is greater than the threshold time, determine that the third fluid flow pathway is clogged or that there is a vent restriction in the blend tank.

9. The system of claim 8, wherein the threshold time is determined based on previous instances of venting pressure through the third fluid flow pathway.

10. The system of claim 2, wherein to automatically operate the one or more respective connections to each of the first fluid flow pathway and the second fluid flow pathway, the control system is adapted to:

raise a pressure in the scale tank to pressurize the first fluid flow pathway and the second fluid flow pathway to a pre-determined pressure;

vent the pressure in the scale tank to the atmosphere; and monitor a time for the pressure in the first and second fluid flow pathways to vent to the atmosphere to determine if there are restrictions in the first and second fluid flow pathways.

11. The system of claim 1, wherein the bulk well material handling system includes a plurality of manifolds through which fluid is supplied to the plurality of fluid flow pathways, and wherein, to automatically operate the one or more respective connections to the fluid flow pathway, the control system is adapted to:

cause fluid to be flowed through the plurality of manifolds;

monitor the plurality of manifolds for decreases in pressure;

upon determining decreases in pressure in the plurality of manifolds, isolate each fluid flow pathway of the plurality of fluid flow pathways to determine a fluid flow pathway through which fluid is leaking.

12. The system of claim 1, wherein the bulk well material handling system includes a plurality of dust collectors connected to one or more fluid flow pathways, each dust collector connected to a differential pressure transducer to monitor a differential pressure across the dust collector filters, and, wherein, the control system is further adapted to:

cause the plurality of dust collectors to be shaken or back-flushed for cleaning for a specified period of time;

cause fluid to be flowed through the plurality of dust collectors; and for each dust collector, monitor a respective differential pressure measured by the differential pressure transducer.

13. The system of claim 1, wherein the bulk well material handling system includes a plurality of compressors connected to one or more fluid flow pathways, and wherein the control system is further adapted to:

cause a pressure in one or more tanks connected to the plurality of compressors to be increased to a pre-determined test pressure; and monitor the one or more tanks for a decrease in the pressure relative to the pre-determined pressure; and monitor the time to pressurize to a pre-determined pressure, comparing against a previously determined threshold time.

14. The system of claim 1, wherein, to analyze the pneumatic integrity of a fluid flow pathway, the control system is adapted to:

maintain a history of threshold pressures and threshold rates of pressure decreases in the plurality of fluid flow pathways, wherein the threshold pressures and the threshold rates of pressure decreases were determined during past operations of the bulk well material handling system; and compare pressures and rates of pressure decreases in the plurality of fluid flow pathways with the threshold pressures and the threshold rates of pressure decreases, respectively.

15. A method for analyzing the pneumatic integrity of a plurality of fluid flow pathways in a bulk well material handling system, the method comprising:

automatically operating, by data processing apparatus, a plurality of connections, each connection connected to a fluid flow pathway of a plurality of fluid flow pathways to transport materials through a bulk well material handling system; and analyzing, by the data processing apparatus, the pneumatic integrity of the plurality of fluid flow pathways in the bulk well material handling system by collecting data from the plurality of connections responsive to the operating.

16. The method of claim 15, wherein, to analyze the pneumatic integrity of a first fluid flow pathway to transport a first dry material to a scale tank, a second fluid flow pathway to transport a second dry material to the scale tank, and a third fluid flow pathway to transport the first dry material and the second dry material from the scale tank to a blend tank, the method further comprises:

raising a pressure in the scale tank to a pre-determined test pressure;

closing the first fluid flow pathway, the second fluid flow pathway, and the third fluid flow pathway;

monitoring the scale tank for a decrease in the pressure relative to the pre-determined test pressure;

determining a decrease in the pressure relative to the pre-determined test pressure in response to monitoring the scale tank;

in response to determining the decrease in the pressure relative to the pre-determined test pressure, determining whether the decrease in the pressure is due to a leak in the first fluid flow pathway, the second fluid flow pathway or the third fluid flow pathway.

17. The method of claim 15, wherein, to analyze the pneumatic integrity of a first fluid flow pathway to transport a first dry material to a scale tank, a second fluid flow pathway to transport a second dry material to the scale tank, the method further comprises:

venting a scale tank pressure;

flowing air from an air manifold through the first fluid flow pathway to the scale tank;

monitoring a pressure in each of the air manifold, the first fluid flow pathway and the scale tank;

determining that a pressure differential between the air manifold, the first fluid flow pathway and the scale tank do not satisfy pre-determined thresholds; and determining that the first fluid flow pathway is restricted or plugged, and wherein, to analyze the pneumatic integrity of a third fluid flow pathway to transport the first dry material and the second dry material from the scale tank to a blend tank, the method further comprises:

raising a pressure in the scale tank to a pre-determined test pressure;

venting the pressure in the scale tank through the first fluid flow pathway, the second fluid flow pathway, and the third fluid flow pathway;

monitoring a time for the pressure to vent through the first fluid flow pathway, the second fluid flow pathway, and the third fluid flow pathway;

determining that a time for the pressure to vent through the third fluid flow pathway from the scale tank to the blend tank is greater than a threshold time; and determining that the third fluid flow pathway is restricted or plugged.

18. The method of claim 15, wherein the bulk well material handling system includes a manifold through which a dry material is transported from a storage tank to a scale tank, and wherein, to analyze the pneumatic integrity of the manifold, the method further comprises:

causing air to be flowed through a common storage aeration manifold that is connected to the manifold through which the dry material is transported from the storage tank to the scale tank;

closing all valves connected to the common storage aeration manifold, other than the air supply valve or valves, to increase a pressure in the common storage aeration manifold;

identifying a plurality of valves that are connected to the common storage aeration manifold, and sequentially opening the plurality of valves, one valve at a time, monitoring the common storage aeration manifold pressures at certain locations;

identifying the stable pressures at the certain locations in the common storage aeration manifold and comparing with pre-determined stable pressures at the certain locations; and in response to identifying any unacceptable variations of the stable pressures relative to the pre-determined stable pressures, isolating and identifying a restricted portion or portions of the manifold and/or malfunctioning valve or valves that are connected to the common storage aeration manifold.

19. A non-transitory computer-readable medium storing instructions executable by data processing apparatus to perform operations comprising:

automatically operating, by data processing apparatus, a plurality of connections, each connection connected to a fluid flow pathway of a plurality of fluid flow pathways to transport materials through a bulk well material handling system; and analyzing, by the data processing apparatus, a pneumatic integrity of the plurality of fluid flow pathways in the bulk well material handling system by collecting data from the plurality of connections responsive to the operating.

20. The medium of claim 19, wherein, to analyze the pneumatic integrity of a first fluid flow pathway to transport a first dry material to a scale tank, a second fluid flow pathway to transport a second dry material to the scale tank, and a third fluid flow pathway to transport the first dry material and the second dry material from the scale tank to a blend tank, the operations further comprise:

raising a pressure in the scale tank to a pre-determined test pressure;

closing the first fluid flow pathway, the second fluid flow pathway, and the third fluid flow pathway;

monitoring the scale tank for a decrease in the pressure relative to the pre-determined test pressure;

determining a decrease in the pressure relative to the pre-determined test pressure in response to monitoring the scale tank;

in response to determining the decrease in the pressure relative to the pre-determined test pressure, determining whether the decrease in the pressure is due to a leak in the first fluid flow pathway, the second fluid flow pathway or the third fluid flow pathway.

* * * * *